US012294813B2

(12) United States Patent
Lei et al.

(10) Patent No.: US 12,294,813 B2
(45) Date of Patent: May 6, 2025

(54) DISTRIBUTED IMAGE ANALYSIS METHOD AND STORAGE MEDIUM FOR PERFORMING IMAGE ANALYSIS BASED ON IMAGE ANALYSIS RESULTS FROM SERVERS

(71) Applicant: HUAWEI TECHNOLOGIES CO., LTD., Guangdong (CN)

(72) Inventors: Ting Lei, Hangzhou (CN); Chao Zou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 645 days.

(21) Appl. No.: 17/350,205

(22) Filed: Jun. 17, 2021

(65) Prior Publication Data

US 2021/0312587 A1    Oct. 7, 2021
US 2022/0138893 A9    May 5, 2022

Related U.S. Application Data

(63) Continuation of application No. PCT/CN2019/124967, filed on Dec. 13, 2019.

(30) Foreign Application Priority Data

Dec. 18, 2018    (CN) .......................... 201811554821.4

(51) Int. Cl.
*H04N 7/18*    (2006.01)
*G06T 1/20*    (2006.01)
(Continued)

(52) U.S. Cl.
CPC ................. *H04N 7/18* (2013.01); *G06T 1/20* (2013.01); *G06T 1/60* (2013.01); *G06T 5/50* (2013.01);
(Continued)

(58) Field of Classification Search
CPC .... H04N 7/18; G06T 1/20; G06T 1/60; G06T 5/50; G06T 7/33; G06V 10/40;
(Continued)

(56) References Cited

U.S. PATENT DOCUMENTS 9,852,340 B2    12/2017    Mai et al.
10,058,076 B2    8/2018    Han et al.
(Continued)

FOREIGN PATENT DOCUMENTS

CN    101159603 A    4/2008
CN    101505412 A    8/2009
(Continued)

OTHER PUBLICATIONS

Hanna Kavalionak et al., "Distributed Video Surveillance Using Smart Cameras", J Grid Computing (2019) 17:59-77, total 19 pages.
(Continued)

*Primary Examiner* — Hwa Andrew Lee

(57) ABSTRACT

A distributed image analysis method performed by a distributed image analysis system comprising a plurality of first servers and a second server. The distributed image analysis method includes: obtaining, by each of the plurality of first servers, a result set through image collision analysis, where the result set includes an index image that records a result object, the index image corresponds to an object frequency; separately sending, by each of the plurality of first servers, a result set to the second server; performing, by the second server, feature extraction on the index image in each of the result sets received from the plurality of first servers, to obtain a feature value of the index image; performing, by the second server, image collision analysis on the extracted feature value of the index image in each of the result sets, to obtain a confidence of the index image; and when determining that a confidence between the index images in the result (Continued)

sets received from the plurality of first servers is greater than or equal to a preset value, obtaining, by the second server, a sum of object frequencies corresponding to the index images.

10 Claims, 8 Drawing Sheets

(51) Int. Cl.
*G06T 1/60* (2006.01)
*G06T 5/50* (2006.01)
*G06T 7/33* (2017.01)
*G06V 10/40* (2022.01)
*G06V 10/74* (2022.01)
*G06V 20/52* (2022.01)

(52) U.S. Cl.
CPC ............... *G06T 7/33* (2017.01); *G06V 10/40* (2022.01); *G06V 10/74* (2022.01); *G06V 20/52* (2022.01)

(58) Field of Classification Search
CPC ........ G06V 10/74; G06V 20/52; G06F 16/51; G06F 16/58; H04L 67/5651; H04L 67/10
See application file for complete search history.

(56) References Cited

U.S. PATENT DOCUMENTS

2008/0253614 A1   10/2008  Baer et al.
2017/0169358 A1*   6/2017  Choi ..................... G06N 20/00

FOREIGN PATENT DOCUMENTS

| CN | 101777064 A | 7/2010 |
| CN | 102638456 A | 8/2012 |
| CN | 105183917 A | 12/2015 |
| CN | 105844634 A | 8/2016 |
| CN | 106971142 A | 7/2017 |
| CN | 107316016 A | 11/2017 |
| CN | 107862242 A | 3/2018 |
| CN | 108491543 A | 9/2018 |
| JP | 2013084098 A * | 5/2013 |
| WO | 2014132841 A1 | 9/2014 |
| WO | 2018097389 A1 | 5/2018 |

OTHER PUBLICATIONS

Extended European Search Report issued in EP19898413.0, dated Jan. 14, 2022, 7 pages.

* cited by examiner

CONT.
FROM
FIG. 6A

CONT.
FROM
FIG. 6A

608. A plurality of first servers separately send a result set obtained by each first server to a second server 609. The second server performs feature extraction on an index image in each result set 610. The second server performs image collision analysis on extracted feature values of all the index images, to obtain a confidence of each index image 611. The second server obtains a sum of object frequencies corresponding to the index images when determining that a confidence between the index images in the result sets sent by the plurality of first servers is greater than or equal to a preset value 612. The second server outputs top N search objects having the highest object frequencies 613. The second server accesses the candidate images through the resource address

FIG. 6B

DISTRIBUTED IMAGE ANALYSIS METHOD AND STORAGE MEDIUM FOR PERFORMING IMAGE ANALYSIS BASED ON IMAGE ANALYSIS RESULTS FROM SERVERS

CROSS-REFERENCE TO RELATED APPLICATIONS

This application is a continuation of International Application No. PCT/CN2019/124967, filed on Dec. 13, 2019, which claims priority to Chinese Patent Application No. 201811554821.4, filed on Dec. 18, 2018, both of which are hereby incorporated by reference in their entireties.

TECHNICAL FIELD

The present invention relates to the field of image analysis technologies, and specifically, relates to a distributed image analysis method and system, and a storage medium for distributed image analysis.

BACKGROUND

With the progress of big data and object recognition technologies, in video surveillance solutions, image collision analysis is deeply applied to the field of security, thereby improving efficiency of investigating and cracking major and key criminal cases, reducing workload of investigators in analyzing case information, and improving efficiency of case handling. In practice, investigators may perform image collision analysis on surveillance images obtained by respective web cameras, to search for an object who frequently appears in a specific period of time and in a specific place. An application scenario is, for example, analysis of a scalper in a railway station.

In actual deployment and use scenarios, a video surveillance system is usually a multi-level domain formed from a provincial level (a center) to prefectural levels (edges). In terms of service, a provincial center and a plurality of prefectures are linked. The provincial center initiates an image collision task, and the image collision task is executed by the prefectures.

In the prior art, because artificial intelligence (AI) service algorithms of the provincial center and the prefectures are provided by different vendors, results of image collision analysis of prefectural servers are not compatible with each other in a provincial central server. To resolve this problem, the prefectural server can only upload local surveillance images to the provincial central server, and the provincial central server receives, stores, and performs image collision analysis on surveillance images of the prefectures in a unified manner. In this case, to perform image collision analysis, the provincial center needs to temporarily store service data uploaded by the prefectures, and then recalculate and analyze the service data, resulting in tremendous pressure on computing and storage resources of the provincial center. Prefectural systems have computing and analysis capacities. In such a solution, computing power resources of the lower-level prefectures are not used, and instead, prefectural systems are merely used as a data storage system, resulting in a waste of computing power. In addition, for uploading of surveillance images, the provincial center and the prefectures need to transmit a large quantity of image streams and video streams, resulting in high requirements on network bandwidth and latency, and high construction costs. Moreover, due to a large volume of surveillance images, it takes a long time for the provincial center to carry out an image collision analysis service.

Therefore, the foregoing problems existing in the prior art need to be alleviated.

SUMMARY

Embodiments of the present invention provide a distributed image analysis method and system, and a storage medium for distributed image analysis. In the distributed image analysis system, a first server is enabled to send image collision analysis results to a second server in a form of a result set, and then the second server performs second image collision analysis on the received result set to sift result objects that frequently appear, where the first server may be a prefectural server, and the second server may be a provincial central server, so that computing power of the prefectural server is fully utilized, resource pressure of the provincial central server is reduced, and time consumption of image collision analysis is decreased. In addition, a volume of the data set is smaller than that of surveillance images, so that pressure of service data transmission is reduced.

In view of this, a first aspect of this application provides a distributed image analysis method, including: obtaining, by a first server, a result set through image collision analysis, where the result set includes an index image, the index image records a result object, the index image corresponds to an object frequency, and the object frequency is used to indicate a quantity of times that the result object is photographed; and sending, by the first server, the result set to a second server, where the result set is used for the second server to perform second image collision analysis. The distributed image analysis method provided by the embodiments of this application is applied to an image analysis system, and the image analysis system includes a plurality of first servers and a second server connected to the plurality of first servers.

It can be seen from the first aspect that the first server sends image collision analysis results to the second server in a form of a result set, and each result object in the result set corresponds to only one index image, so that a data transmission volume is reduced. Moreover, the index image corresponds to the object frequency, so that the data transmission volume is reduced without affecting presentation of the image collision analysis results of the first server, and in addition, computing power of the first server is fully utilized, resource pressure of the second server is reduced, and computing efficiency of an image collision analysis algorithm is improved.

With reference to the first aspect, in a first example embodiment, the obtaining, by a first server, a result set through image collision analysis includes: obtaining, by the first server, a plurality of candidate images, where the candidate images are images that include the result object among images stored in the first server; determining, by the first server, the index image from the plurality of candidate images; and determining, by the first server, a quantity of the candidate images as the object frequency.

It can be seen from the first example embodiment of the first aspect that the first server may obtain the index image from the candidate images randomly or based on a preset rule, to generate the result set. In such a method, the index image can be obtained from the candidate images quickly, and computing power is saved. In addition, the first server adds the quantity of the candidate images to the index image as the object frequency, so that the index image can represent all candidate images recording a same result object in the first server, for the second server to perform the second image collision analysis.

With reference to the first example embodiment of the first aspect, in a second example embodiment, before the obtaining, by a first server, a result set through image collision analysis, the method further includes: receiving, by the first server, a target instruction sent by the second server, where the target instruction includes a confidence threshold; and the obtaining, by the first server, a plurality of candidate images includes: performing, by the first server, feature extraction on stored images, to obtain a feature value of each of the stored images, where the stored images are all images stored in the first server, performing, by the first server, image collision analysis on feature values of the stored images, to obtain a confidence of each stored image; and obtaining, by the first server, stored images having a confidence greater than or equal to the confidence threshold as the candidate images that collectively include the same result object.

It can be seen from the second example embodiment of the first aspect that the target instruction includes the confidence threshold, and when executing the image collision algorithm, the first server selects images having a confidence greater than the confidence threshold from the stored images as the candidate images. That is, if a confidence between every two result objects recorded in images is higher than the confidence threshold, the result objects are determined as the same result object.

With reference to the second example embodiment of the first aspect, in a third example embodiment, if the target instruction further includes a target time period and/or a target camera identifier, the performing, by the first server, feature extraction on stored images includes: performing, by the first server, feature extraction on the stored images in the target time period, and/or performing, by the first server, feature extraction on the stored images photographed by a camera that is identified by the target camera identifier.

With reference to the first example embodiment of the first aspect, in a fourth example embodiment, the determining, by the first server, the index image from the plurality of candidate images includes: obtaining, by the first server, image quality of each candidate image through an image analysis algorithm; and selecting, by the first server, an image having the highest image quality from the candidate images as the index image.

It can be seen from the fourth example embodiment of the first aspect that after obtaining the candidate images, the first server obtains the image having the highest image quality among the candidate images as the index image through the image analysis algorithm, where the index image accurately represents the result object collectively recorded by the candidate images, and is provided for the second server to perform the second image collision analysis. The highest image quality may be that lighting conditions are the best when the image is taken, or the like, or the photographed object is not blocked.

With reference to any one of the first to fourth example embodiments of the first aspect, in a fifth example embodiment, after the obtaining, by the first server, a plurality of candidate images, the method further includes: obtaining, by the first server, a resource address of the candidate images; and obtaining, by the first server, the result set, where the result set includes the resource address, the resource address is used for the second server to access the candidate images through the resource address.

It can be seen from the fifth example embodiment of the first aspect that the resource address of the candidate images is added to the result set sent by the first server, so that the second server can access the candidate images stored in the first server through the resource address. The resource address saves more resources in terms of format and does not occupy a transmit resource and a storage resource of the second server while enabling the second server to access all candidate images, so that all candidate images recording the result object of interest are obtained.

A second aspect of this application provides a distributed image analysis method, including: receiving, by a second server, result sets that are separately sent by a plurality of first servers and that are each obtained by each first server, where each result set includes an index image, the index image records a result object, the index image corresponds to an object frequency, and the object frequency is used to indicate a quantity of times that the result object is photographed; performing, by the second server, feature extraction on an index image in each result set, to obtain a feature value of the index image; performing, by the second server, image collision analysis on extracted feature values of all the index images, to obtain a confidence of each index image; and obtaining, by the second server, a sum of object frequencies corresponding to the index images when determining that a confidence between the index images in the result sets sent by the plurality of first servers is greater than or equal to a preset value.

It can be seen from the second aspect that the result set received by the second server includes the index image and the object frequency corresponding to the index image. Therefore, the second server only needs to receive one image, that is, the index image, to obtain all information of a result object, thereby greatly improving transmission efficiency. In addition, because the index image is an ordinary image file and is compatible with algorithms of different vendors, the first server and the second server are compatible with each other even if algorithms of different vendors are installed on the first server and the second server, so that computing power of servers at all levels is fully utilized, thereby improving computing efficiency.

With reference to the second aspect, in a first example embodiment, the result set includes a resource address of the candidate images, the candidate images are images that record the result object among images stored in the first server, and the stored images are all images stored in the first server; and after the obtaining a sum of object frequencies corresponding to the index images, the method further includes: accessing, by the second server, the candidate images through the resource address.

It can be seen from the first example embodiment of the second aspect that because the result set includes only the index image without the remaining candidate images, when obtaining a result object having the highest frequency of being photographed, a user is interested in looking up all candidate images recording the result object. In this case, the second server can access the candidate images stored in the first server through the resource address.

With reference to the first example embodiment of the second aspect, in a second example embodiment, before the second server receives the result sets sent by the plurality of first servers, the method further includes: sending, by the second server, a target instruction to the first servers, where the target instruction includes a confidence threshold, and a confidence between any candidate images in the first server is greater than or equal to the confidence threshold.

It can be seen from the second example embodiment of the second aspect that if the target instruction includes a confidence threshold, the second server can control, through the target instruction, the first server to compare locally stored images through image collision analysis when the first server executes the image collision algorithm. If a confidence between two stored images is greater than or equal to the confidence threshold, it is determined that the two stored images record a same result object, so the two stored images are classified as candidate images recording the same result object. Therefore, the second server can control, through the target instruction, conditions through which the first server sifts the candidate images, thereby regulating and controlling a working condition of the first server.

With reference to the second example embodiment of the second aspect, in a third example embodiment, if the target instruction further includes a target time period and/or a target camera identifier, the target instruction is used for the first server to perform feature extraction on the stored images in the target time period, and/or the first server performs feature extraction on the stored images photographed by a camera that is identified by the target camera identifier.

It can be seen from the third example embodiment of the second aspect that if the target instruction includes a target time period, then the second server ma control the first server to obtain candidate images photographed in the target time period; and if the target instruction includes the target camera identifier, the first server obtains candidate images photographed by a camera that is identified by the target camera identifier, so that the second server can sift conditions of image collision analysis through the target instruction.

A third aspect of this application provides an image analysis server, including: a first obtaining unit, configured to obtain a result set through image collision analysis, where the result set includes an index image, the index image records a result object, the index image corresponds to an object frequency, and the object frequency is used to indicate a quantity of times that the result object is photographed; and a first sending unit, configured to send the result set obtained by the first obtaining unit to a second server, where the result set is used for the second server to perform second image collision analysis.

It can be seen from the third aspect that the server sends the image collision analysis results to the second server in a form of a result set, and the result set uses the index image to represent a result object, so that data transmission volume is reduced. Moreover, the index image corresponds to the object frequency, so that the second server can perform frequency calculation, and in addition, computing power of servers at all levels is fully utilized, and computing efficiency of an image collision analysis algorithm is improved.

With reference to the third aspect, in a first example embodiment, the first obtaining unit is further configured to: obtain a plurality of candidate images, where the candidate images are images that include the result object among images stored in the first server, determine the index image from the plurality of candidate images; and determine a quantity of the candidate images as the object frequency.

It can be seen from the first example embodiment of the third aspect that the server may select, specifically randomly or based on a preset rule, at least one of the candidate images stored locally as the index image, to generate the result set. In such a method, the index image can be obtained from the candidate images quickly, and computing power is saved. In addition, the first server adds the quantity of the candidate images to the index image as the object frequency, so that the index image can represent all candidate images recording a same result object in the first server, for the second server to perform the second image collision analysis.

With reference to the first example embodiment of the third aspect, in a second example embodiment, the server further includes a first receiving unit, configured to receive a target instruction sent by the second server, where the target instruction includes a confidence threshold; and the first obtaining unit is configured to: perform feature extraction on stored images, to obtain a feature value of each of the stored images, where the stored images are all images stored in the first server; perform image collision analysis on feature values of the stored images, to obtain a confidence of each stored image; and obtain stored images having a confidence greater than or equal to the confidence threshold as the candidate images that collectively include the same result object.

It can be seen from the second example embodiment of the third aspect that the server compares locally stored images through image collision analysis. If a confidence between two stored images is greater than or equal to the confidence threshold, it is determined that the two stored images record the same result object, so the two stored images are classified as candidate images recording the same result object. Therefore, the second server can control, through the target instruction, conditions through which the server sifts the candidate images, thereby regulating and controlling a working condition of the server.

With reference to the second example embodiment of the third aspect, in a third example embodiment, the first receiving unit is further configured to receive the target instruction sent by the second server, where the target instruction further includes a target time period and/or a target camera identifier, and the first obtaining unit is further configured to perform feature extraction on the stored images in the target time period, and/or perform feature extraction on the stored images photographed by a camera that is identified by the target camera identifier.

It can be seen from the third example embodiment of the third aspect that if the target instruction further includes a target time period, then the server obtains candidate images photographed in the target time period; and if the target instruction includes the target camera identifier, the first server obtains candidate images photographed by a camera that is identified by the target camera identifier, so that the first obtaining unit can obtain surveillance images of a designated location as required by the second server.

With reference to the first example embodiment of the third aspect, in a fourth example embodiment, the first obtaining unit is further configured to: perform feature extraction on each of the all candidate images, to obtain a feature value of the candidate image; perform image collision analysis on the feature values of the candidate images, to obtain a confidence level of each of the candidate images; and obtain a candidate image having the highest confidence from the candidate images as the index image.

It can be seen from the fourth example embodiment of the third aspect that after obtaining the candidate images, the server obtains the image having the highest confidence among the candidate images as the index image, where the index image accurately represents the result object collectively recorded by the candidate images, and is provided for the second server to perform the second image collision analysis.

With reference to any one of the first to fourth example embodiments of the third aspect, in a fifth example embodiment, the first obtaining unit is further configured to: obtain a resource address of the candidate images; and obtain the result set, where the result set includes the resource address, the resource address is used for the second server to access the candidate images through the resource address.

It can be seen from the fifth example embodiment of the third aspect that the resource address of the candidate images is added to the result set sent by the server, so that the second server can access the candidate images stored in the server through the resource address. The resource address saves more resources in terms of format and does not occupy a transmit resource and a storage resource of the second server while enabling the second server to access all candidate images, so that all candidate images recording the result object of interest are obtained.

A fourth aspect of this application provides an image analysis server, including:

a second obtaining unit, configured to receive result sets that are separately sent by the plurality of first servers and that are each obtained by each first server, where each result set includes an index image, the index image records a result object, the index image corresponds to an object frequency, and the object frequency is used to indicate a quantity of times that the result object is photographed; an analysis unit, configured to: perform feature extraction on an index image in each result set obtained by the second obtaining unit, to obtain a feature value of the index image; and perform image collision analysis on extracted feature values of all the index images, to obtain a confidence of each of the index images; and an output unit, configured to obtain a sum of object frequencies corresponding to the index images when determining that a confidence between the index images in the result sets sent by the plurality of first servers is greater than or equal to a preset value.

It can be seen from the fourth aspect that the result set received by the server includes the index image and the object frequency corresponding to the index image. The server only needs to perform image collision analysis on the index image to obtain information of a frequency at which a result object appears, thereby greatly improving transmission efficiency. In addition, because the index image is an ordinary image file and is compatible with algorithms of different vendors, servers are compatible with each other even if algorithms of different vendors are installed on the servers, so that computing power of servers at all levels is fully utilized, thereby improving computing efficiency.

With reference to the fourth aspect, in a first example embodiment, the result set includes a resource address of the candidate images, the candidate images are images that record the result object among images stored in the first server, and the stored images are all images stored in the first server, and the second obtaining unit is further configured to access the candidate images through the resource address.

It can be seen from the first example embodiment of the fourth aspect that because the result set includes only the index image without the remaining candidate images, when obtaining a result object having the highest frequency of being photographed, a user is interested in looking up all candidate images recording the result object. In this case, the server can access the candidate images stored in the first server through the resource address.

With reference to the first example embodiment of the fourth aspect, in a second example embodiment, the server further includes a second sending unit, configured to send a target instruction to the first server, where the target instruction includes a confidence threshold, and a confidence between any candidate images in the first server is greater than or equal to the confidence threshold.

It can be seen from the second example embodiment of the fourth aspect that if the target instruction includes the confidence threshold, the server may control sifting conditions of the image collision analysis of the first server through the target instruction.

With reference to the second example embodiment of the fourth aspect, in a third example embodiment, the second sending unit is further configured to send the target instruction to the first server, where the target instruction further includes a target time period and/or a target camera identifier, where the target instruction is used for the first server to perform feature extraction on the stored images in the target time period, and/or the first server performs feature extraction on the stored images photographed by a camera that is identified by the target camera identifier.

It can be seen from the third example embodiment of the fourth aspect that if the target instruction includes a target time period, the server may control the first server to obtain candidate images photographed in the target time period, thereby sifting conditions of image collision analysis.

A fifth aspect of this application provides an image analysis server, including: a processor and a memory, where the memory is configured to store a computer-executable instruction; the processor executes the computer-executable instruction stored in the memory when the image analysis server is run, to cause the image analysis server to perform the distributed image analysis method according to the first aspect or any example embodiment of the first aspect.

A sixth aspect of this application provides an image analysis server, including: a processor and a memory, where the memory is configured to store a computer-executable instruction; the processor executes the computer-executable instruction stored in the memory when the image analysis server is run, to cause the image analysis server to perform the distributed image analysis method according to the second aspect or any example embodiment of the second aspect.

A seventh aspect of this application provides a computer-readable storage medium, including one or more instructions, where the one or more instructions, when run on a computer device, causes the computer device to perform the method according to the first aspect or any implementation of the first aspect.

An eighth aspect of this application provides a computer-readable storage medium, including one or more instructions, where the one or more instructions, when run on a computer device, causes the computer device to perform the method according to the second aspect or any implementation of the second aspect.

It can be seen from the foregoing technical solutions that the embodiments of this application have the following advantages.

The embodiments of the present invention provide a distributed image analysis method and system, and a storage medium for distributed image analysis, including: obtaining, by a first server, a result set through image collision analysis, where the result set includes an index image, the index image records a result object, the index image corresponds to an object frequency, and the object frequency is used to indicate a quantity of times that the result object is photographed; separately sending, by a plurality of first servers, a result set obtained by each of the plurality of first servers to a second server; performing, by the second server, feature extraction on an index image in each result set, to obtain a feature value of the index image; performing, by the second server, image collision analysis on extracted feature values of all the index images, to obtain a confidence of each of the index images; and obtaining, by the second server, a sum of object frequencies corresponding to the index images when determining that a confidence between the index images in the result sets sent by the plurality of first servers is greater than or equal to a preset value. The first server may be a prefectural server, and the second server may be a provincial central server. The format of the data set is not limited by a type of AI service algorithm. Computing power of the first servers and the second server is fully utilized in two times of image collision analysis, so that resource pressure of the second server is reduced, and a speed of image collision analysis is increased. In addition, a data set volume is smaller, and pressure of service data transmission is reduced.

BRIEF DESCRIPTION OF DRAWINGS

FIG. 6A and FIG. 6B are a schematic diagram of another exemplary distributed image analysis method according to an embodiment of this application;

DESCRIPTION OF EMBODIMENTS

Embodiments of the present invention provide a distributed image analysis method and system, and a storage medium for distributed image analysis. In the distributed image analysis system, a first server is enabled to send image collision analysis results to a second server in a form of a result set, and the second server performs second image collision analysis after obtaining result sets sent by a plurality of first servers, so that results of different algorithms are compatible with each other, and computing power of servers at all levels is fully utilized.

To make a person of ordinary skill in the art understand the technical solutions in this application better, the following clearly describes the technical solutions in the embodiments of this application with reference to the accompanying drawings in the embodiments of this application. It is clear that the described embodiments are merely a part rather than all of the embodiments of this application. All other embodiments obtained by a person of ordinary skill in the art based on the embodiments of this application without creative efforts shall fall within the protection scope of this application.

In the specification, claims, and accompanying drawings of this application, the terms "first", "second", "third", "fourth", and or the like (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
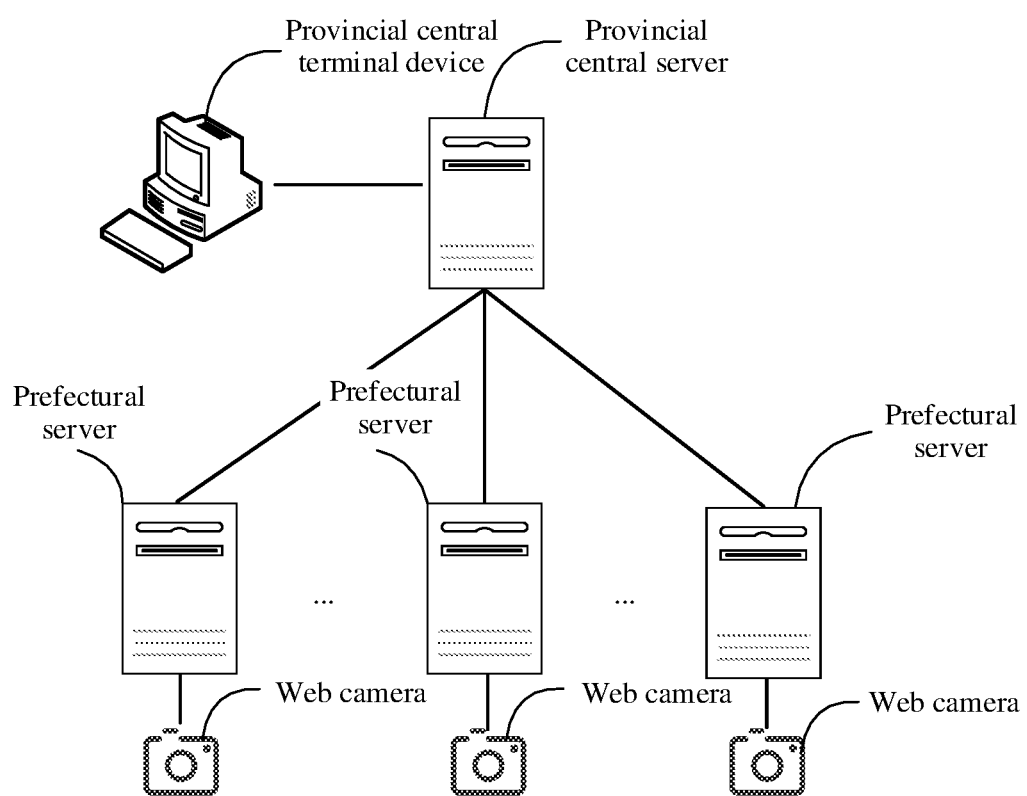
FIG. 1 is an architectural topology diagram of image analysis of two-level, provincial and prefectural servers according to an embodiment of this application.

As shown in FIG. 1, in video surveillance solutions, the big data-based image collision analysis technology is deeply applied to the field of security, thereby improving efficiency of investigating and cracking major and important cases, reducing workload of investigators in analyzing case information, and improving efficiency of case handling. In practice, investigators may perform image collision analysis on surveillance images obtained by respective web cameras, to search for an object who frequently appears in a specific period of time and in a specific place. An application scenario is, for example, analysis of a scalper in a railway station.

An example execution manner of the foregoing image collision analysis algorithm is to sequentially compare a stored target image with other stored images one by one. The target image is any stored image. When a similarity between a result object recorded by an image and a result object recorded by the target image is higher than a threshold, it is determined that the result objects recorded by the image and the target image are a same object. In this case, because there are two images recording the same result object, it is determined that the frequency for the result object to be photographed is two. The foregoing steps are repeated, and the target image is continuously compared with another image until an occurrence frequency of the same result object in all stored images is obtained. The similarity is referred to as a confidence in the field of image collision analysis technologies. A high confidence indicates that an image records a result object more clearly. The image may be a photo or a video, and the result object may be a car.

In actual deployment and use scenarios, a video surveillance system is usually a multi-level domain formed from a provincial level (a center) to prefectural levels (edges). In terms of service, a provincial center and a plurality of prefectures are linked. The provincial center initiates an image collision task, and the image collision task is executed by the prefectures. In this way, a frequency of being photographed of a result object can be searched for in the whole province, and top N result objects having the highest frequencies of being photographed in the whole province can be obtained.

Because artificial intelligence (AI) algorithms through which the provincial center and the prefectures perform image collision analysis are provided by different vendors, results of image collision analysis of prefectural servers are not compatible with each other in a provincial central server. To resolve this problem, the prefectural server can only upload local surveillance images photographed by web cameras to the provincial central server, and the provincial central server receives, stores, and performs image collision analysis on surveillance images of the prefectures in a unified manner. In this case, to perform image collision analysis, the provincial center needs to temporarily store service data uploaded by the prefectures, and then recalculate and analyze the service data.

In this case, tremendous pressure is brought to computing and storage resources of the provincial center. Prefectural systems have computing and analysis capacities. In such a solution, computing power resources of the lower-level prefectures are not used, and instead, prefectural systems are merely used as a data storage system, resulting in a waste of computing power. In addition, for uploading of surveillance images, the provincial center and the prefectures need to transmit a large quantity of image streams and video streams, resulting in high requirements on network bandwidth and latency, and high construction costs. Moreover, due to a large volume of surveillance images, it takes a long time for the provincial center to carry out an image collision analysis service.

To overcome the foregoing problems, the embodiments of this application provide a distributed image analysis method and system, and a storage medium for a distributed image analysis. In the distributed image analysis system, the image collision analysis results of the first server can be sent to the second server in a form of a result set, thereby overcoming differences in algorithms, sharing image collision analysis results between servers of all levels, fully utilizing computing power of servers at all levels in a multi-level domain system, reducing information transmission pressure, and improving computing efficiency.

Figure 2:
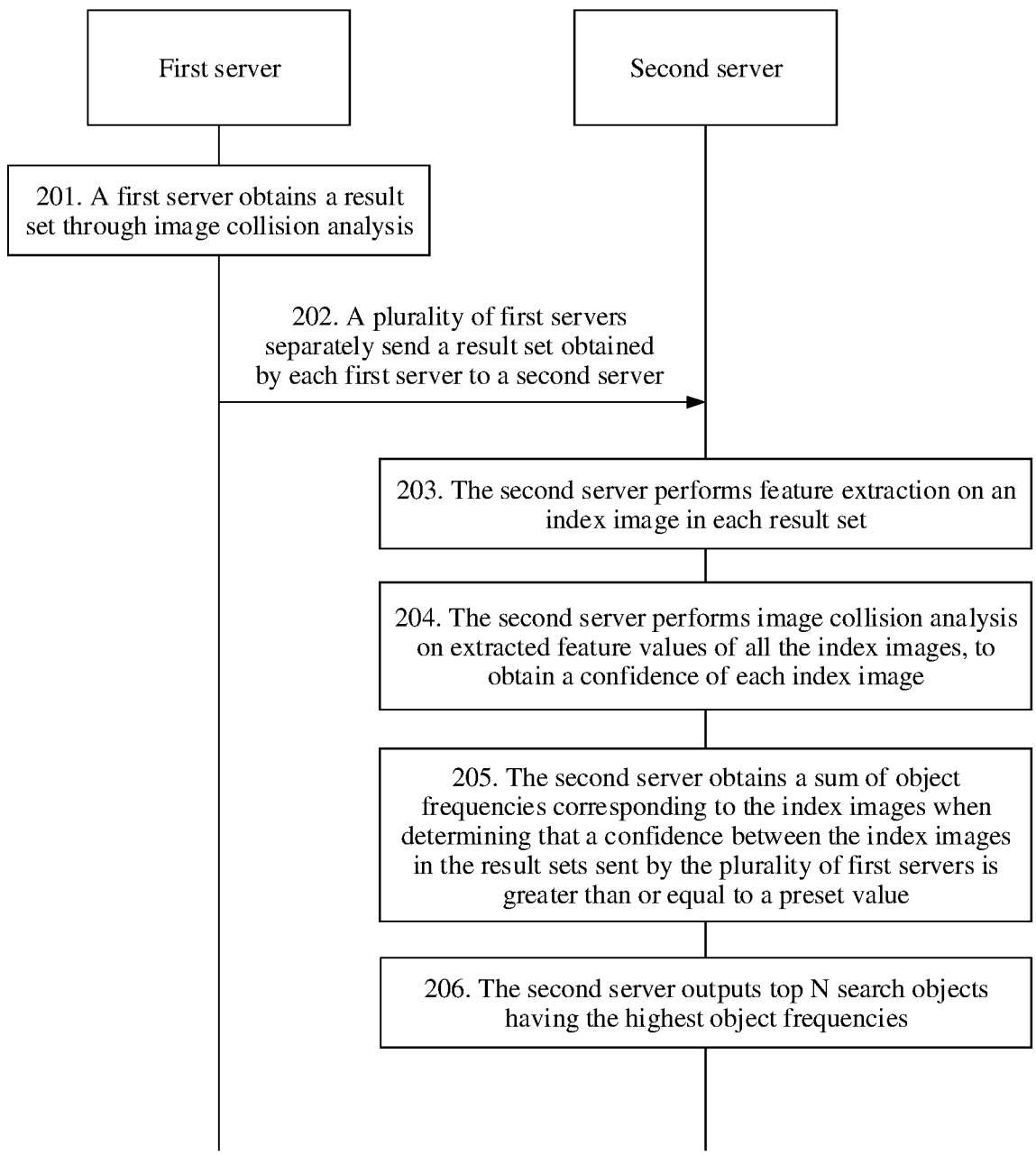
FIG. 2 is a schematic diagram of an exemplary distributed image analysis method according to an embodiment of this application.

For ease of understanding, a specific procedure in this embodiment of this application is described below. Referring to FIG. 2, an exemplary distributed image analysis method according to an embodiment of this application includes:

201. A first server obtains a result set through image collision analysis.

In this embodiment, the result set includes an index image, the index image records a result object, the index image corresponds to an object frequency, and the object frequency is used to indicate a quantity of times that the result object is photographed. Specifically, a file name of the index image records information of the object frequency.

For example, the first server is a Shenzhen server, and a result set obtained by the Shenzhen server through image collision analysis includes two result sets A and B. The result set A includes an index image A, and the result set B includes an index image B. Two result objects, an Object A and an Object B, are recorded separately in the index images. The index image A corresponds to that a quantity of times that the Object A is photographed in Shenzhen is 100, and index image B corresponds to that a quantity of times that the Object B is photographed in Shenzhen is 200.

202. A plurality of first servers separately send a result set obtained by each first server to a second server.

In this embodiment, each first server may send one result set or a plurality of result sets to the second server, where only one result object is recorded in each result set, and the result object may be a car. The result object is not specifically limited in embodiments of the present invention.

For example, the second server is a Guangdong server, a first server, namely, a Shenzhen server, sends the foregoing result sets A and B to the Guangdong server, and another first server, namely, a Dongguan server, sends result sets C, D, and E to the Guangdong server, where the result set C includes an index image C, the result set D includes an index image D, and the result set E includes an index image E. The index image C records that a quantity of times that a result object, an Object C, is photographed in Dongguan is 100, the index image D records that a quantity of times that a result object, the Object A, is photographed in Dongguan is 10, and the index image E records that a quantity of times that a result object, the Object B, is photographed in Dongguan is 20.

203. The second server performs feature extraction on an index image in each of the result sets received from the plurality of first servers, to obtain a feature value of the index image.

In this embodiment, the second server performs feature extraction through an image analysis algorithm, to obtain the feature value of each index image. A specific calculation process of the image analysis algorithm belongs to the prior art, and details are not described in embodiments of the present invention.

For example, the Guangdong server has received the foregoing five index images A, B, C, D, and E. Through feature extraction, a feature value of the Object A is obtained in the index image A, a feature value of the Object B is obtained in the index image B, a feature value of the Object C is obtained in the index image C, a feature value of the Object A is obtained in the index image D, and a feature value of the Object B is obtained in the index image E.

204. The second server performs image collision analysis on extracted feature values of all the index images, to obtain a confidence of each index image.

In this embodiment, the second server obtains confidences between all index images through image collision analysis.

For example, the Guangdong server compares the five index images A, B, C, D, and E through the image analysis algorithm, to obtain that a confidence between the image A and the image D is 90%, a confidence between the image B and the image E is 93%, and a confidence threshold between the remaining images is less than 30%.

205. The second server obtains a sum of object frequencies corresponding to the index images when determining that a confidence between the index images in the result sets sent by the plurality of first servers is greater than or equal to a preset value.

In this embodiment, the second server determines, through the preset value, whether a same result object is recorded between the index images.

For example, if the Guangdong server presets a confidence to 90%, it is determined that the index image A and the index image D collectively record the result object the Object A, and the index image B and the index image E collectively record the index object—the Object B. In this case, the Guangdong server can learn that the Object A's total frequency of being photographed in Shenzhen and Dongguan is 110, and the Object B's total frequency of being photographed in Shenzhen and Dongguan is 220. Further, if the plurality of first servers include all prefectures in Guangdong, the Guangdong server may learn of the Object A's total frequency of being photographed and the Object B's total frequency of being photographed in Guangdong in the foregoing manner.

In this embodiment, the preset value is specified by a user, and a function thereof is to determine, when a confidence between two index images is greater than or equal to the preset value, that the two index images record the same result object. In this case, object frequencies corresponding to the two index images are obtained, so that a quantity of times that the result object is photographed is obtained. The foregoing description is merely used for ease of understanding. In practice, it is not limited to that a confidence between two index images is greater than a threshold. Alternatively, it may be that a confidence between a plurality of index images is greater than a threshold.

206. The second server outputs top N result objects having the highest object frequencies.

In this embodiment, N is a positive integer greater than or equal to 1, and a specific value of N is set by a user, so that the user may obtain top N result objects having the largest quantities of times of being photographed within the range of the second server.

For example, the user sets a value of N to 1, that is, the user requests the Guangdong server to output a result object having the highest object frequency. In this case, an output result object having the highest quantity of times of being photographed is the Object B whose total frequency of being photographed in Shenzhen and Dongguan is 220.

It should be noted that an objective for which the Guangdong server cooperates with the Shenzhen server and the Dongguan server to perform the distributed image analysis method is to find an unspecified object who appears most frequently in the two cities, Shenzhen and Dongguan. That is, the second server cannot determine a to-be-obtained result object before the distributed image analysis method is completed.

In this embodiment, the result set sent by the first server includes an index image and an object frequency corresponding to the index image. Therefore, in this embodiment, the first server only needs to upload one image, that is, the index image, to report all information of a result object to the second server, thereby greatly improving transmission efficiency. In addition, because the index image is an ordinary image file and is compatible with algorithms of different vendors, the first server and the second server are compatible with each other even if algorithms of different vendors are installed on the first server and the second server, so that computing power of servers at all levels is fully utilized, thereby improving computing efficiency.

It should be noted that, in the above case, a specific manner of obtaining the index image in the result set is not limited. Further, two manners for obtaining the index image are provided in the following: a manner of randomly obtaining the index image from the candidate images and a manner of obtaining the candidate image having the highest confidence as the index image.

1. An Index Image is Randomly Obtained from Candidate Images.

Figure 3:
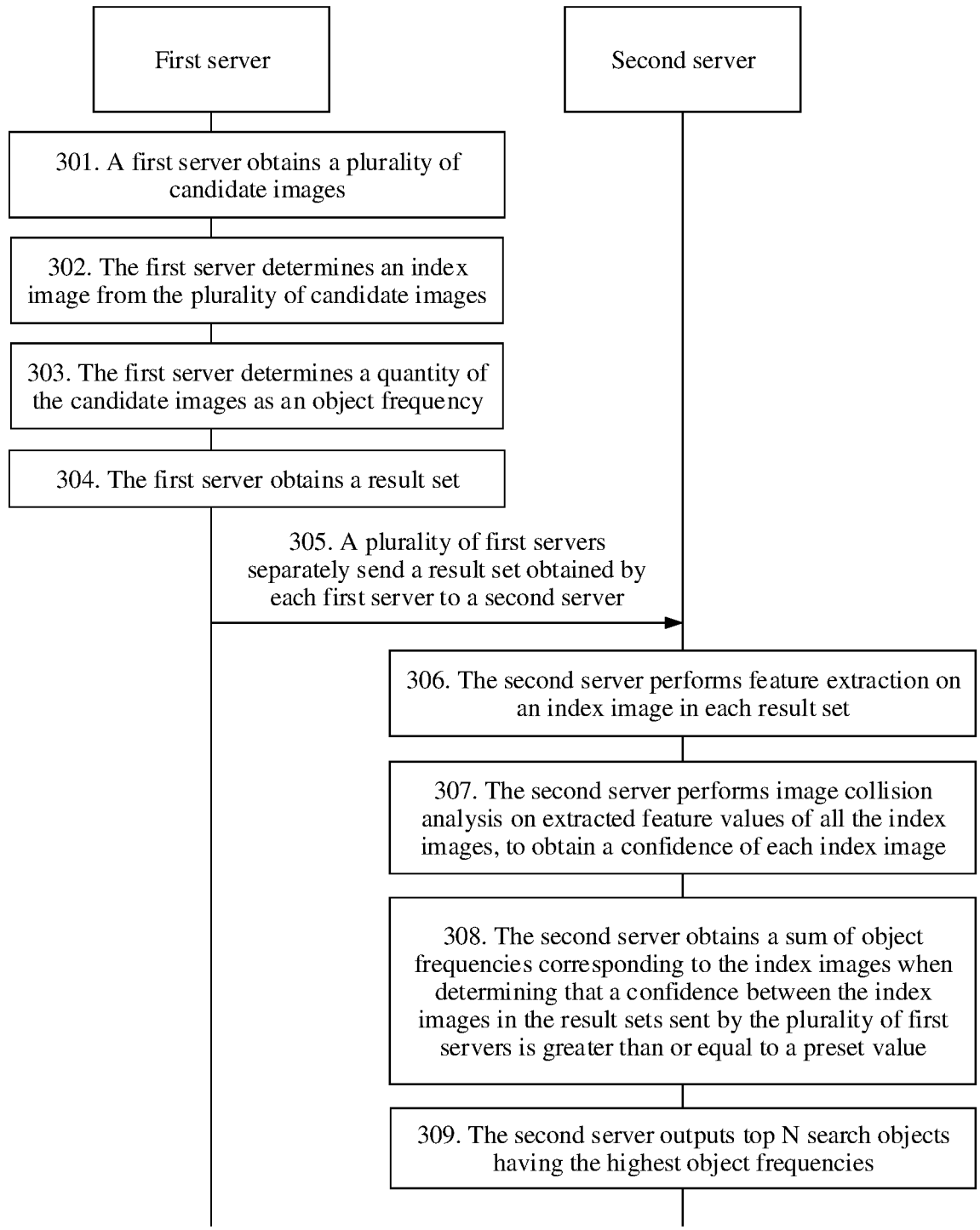
FIG. 3 is a schematic diagram of another exemplary distributed image analysis method according to an embodiment of this application.

In this embodiment, the first server obtains all images recording a same result object as candidate images of a result set, and then determines the index image from the candidate images. For ease of understanding, a specific procedure of this case is described below. Referring to FIG. 3, an exemplary distributed image analysis method according to an embodiment of this application includes the following steps.

301. A first server obtains a plurality of candidate images.

In this embodiment, the candidate images are images recording the result object.

For example, the foregoing Shenzhen server performs image collision analysis on the stored images, to obtain 100 images recording the Object A, and the 100 images are candidate images of the result object—the Object A.

302. The first server determines an index image from the plurality of candidate images.

In this embodiment, the first server determines the index image from the plurality of candidate images in a manner of randomly selecting at least one of the plurality of candidate images as the index image, or selecting the index image from the candidate images based on a preset rule.

For example, the Shenzhen server determines one of the 100 images recording the Object A as an index image for representing the Object A. A determining manner may be randomly selecting the index image from the 100 images, or may be selecting the index image from the 100 images based on a preset rule.

303. The first server determines a quantity of the candidate images as an object frequency.

In this embodiment, a quantity of candidate images corresponding to a result object is a frequency of being photographed of the result object, that is, the object frequency.

For example, if the Shenzhen server obtains that a quantity of candidate images recording the Object A is 100, it is determined that an object frequency corresponding to the index image of the Object A is 100.

304. The first server obtains a result set.

In this embodiment, the result set includes the foregoing index image, and the index image corresponds to the object frequency.

For example, a result set obtained by the Shenzhen server includes a result set A, and the result set A includes an index image representing the Object A. An object frequency of the Object A being photographed corresponding to the index image representing the Object A is 100.

For steps 305 to 309, refer to steps 202 to 206. Details are not repeated herein.

In this embodiment, the first server obtains, through the image analysis algorithm, all images recording the same result object as the candidate images, then randomly selects at least one of the candidate images as an index image, and also records a quantity of the candidate images as an object frequency in the index image, to generate a result set. In this method, the index image can be quickly obtained from the candidate images, so that computing power is saved.

It should be noted that the foregoing method has relatively high requirements on the confidences between the candidate images stored in the first server. This method can be used only when most of the confidences between the candidate images are relatively high, and is suitable for a case in which photographing is performed by high-quality web cameras under sufficient lighting. To overcome this disadvantage, this embodiment of the present invention provides a manner of obtaining top N candidate images having the highest confidences as index images.

2. A Candidate Image Having the Highest Confidence is Obtained as an Index Image.

In this embodiment, for the obtained candidate images recording the same result object, the first server obtains the candidate image having the highest confidence as the index image, thereby ensuring that the index image has a reliable confidence, and ensuring the accuracy of image analysis.

Figure 4:
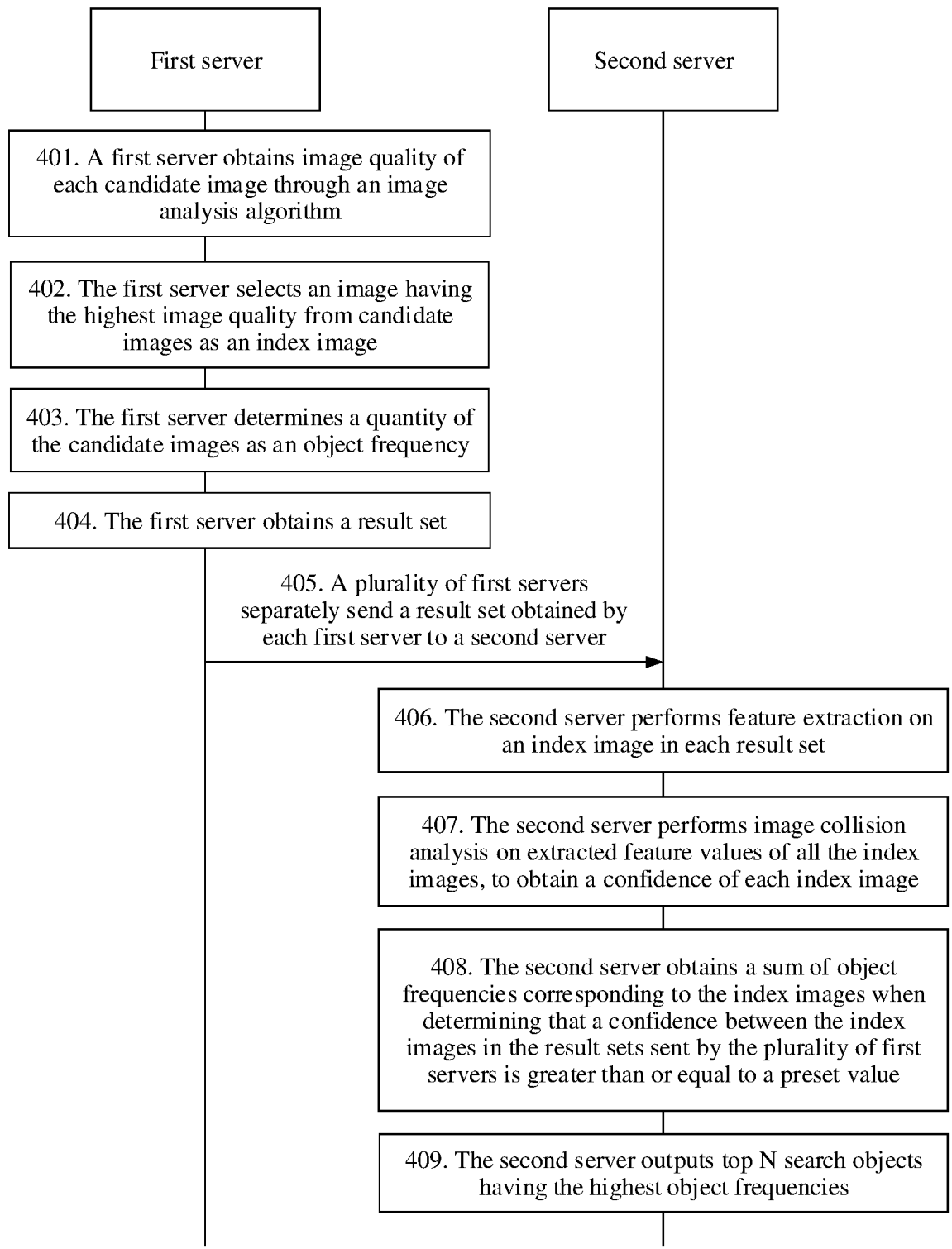
FIG. 4 is a schematic diagram of another exemplary distributed image analysis method according to an embodiment of this application.

For ease of understanding, a specific procedure of this embodiment is described below. Referring to FIG. 4, an exemplary distributed image analysis method according to an embodiment of this application includes:

401. A first server obtains image quality of each candidate image through an image analysis algorithm.

In this embodiment, the image analysis algorithm is a well-known algorithm, and details are not repeated herein. Through the image analysis algorithm, image quality of a photographed image can be obtained. The image quality includes light conditions when the image is photographed, for example, whether a photographed object is occluded, and so on. Higher image quality indicates that a photographed object recorded by the image is clearer and more reliable.

For example, the Shenzhen server performs the image analysis algorithm on 100 candidate images recording the Object A, to obtain image quality of each candidate image recording the Object A. Because each time the Object A is photographed, photographing conditions, such as an angle of photographing the Object A, photographing light, differ, image quality of each candidate image recording the Object A differs.

402. The first server selects an image having the highest image quality from candidate images as an index image.

In this embodiment, the first server selects the candidate image having the highest image quality as the index image, and the index image can best represent the result object collectively recorded by the candidate images, thereby helping increase accuracy of second image collision analysis performed by the second server.

For example, among 100 candidate images recording the Object A, the Shenzhen server selects an image having the highest image quality as an index image representing the Object A. Because the index image is the candidate image having the highest image quality, and the lighting conditions are the best during photographing, so that accuracy of the Guangdong server in performing the second image collision analysis is ensured.

For steps 403 to 409, refer to steps 303 to 309. Details are not repeated herein again.

In this embodiment, after obtaining the candidate images, the first server obtains the candidate image having the highest confidence as the index image. The method can ensure that the index image is the image having the highest confidence, accurately represents the result object collectively recorded by the candidate images, and is provided for a higher-level server to perform the second image collision analysis.

Figure 5:
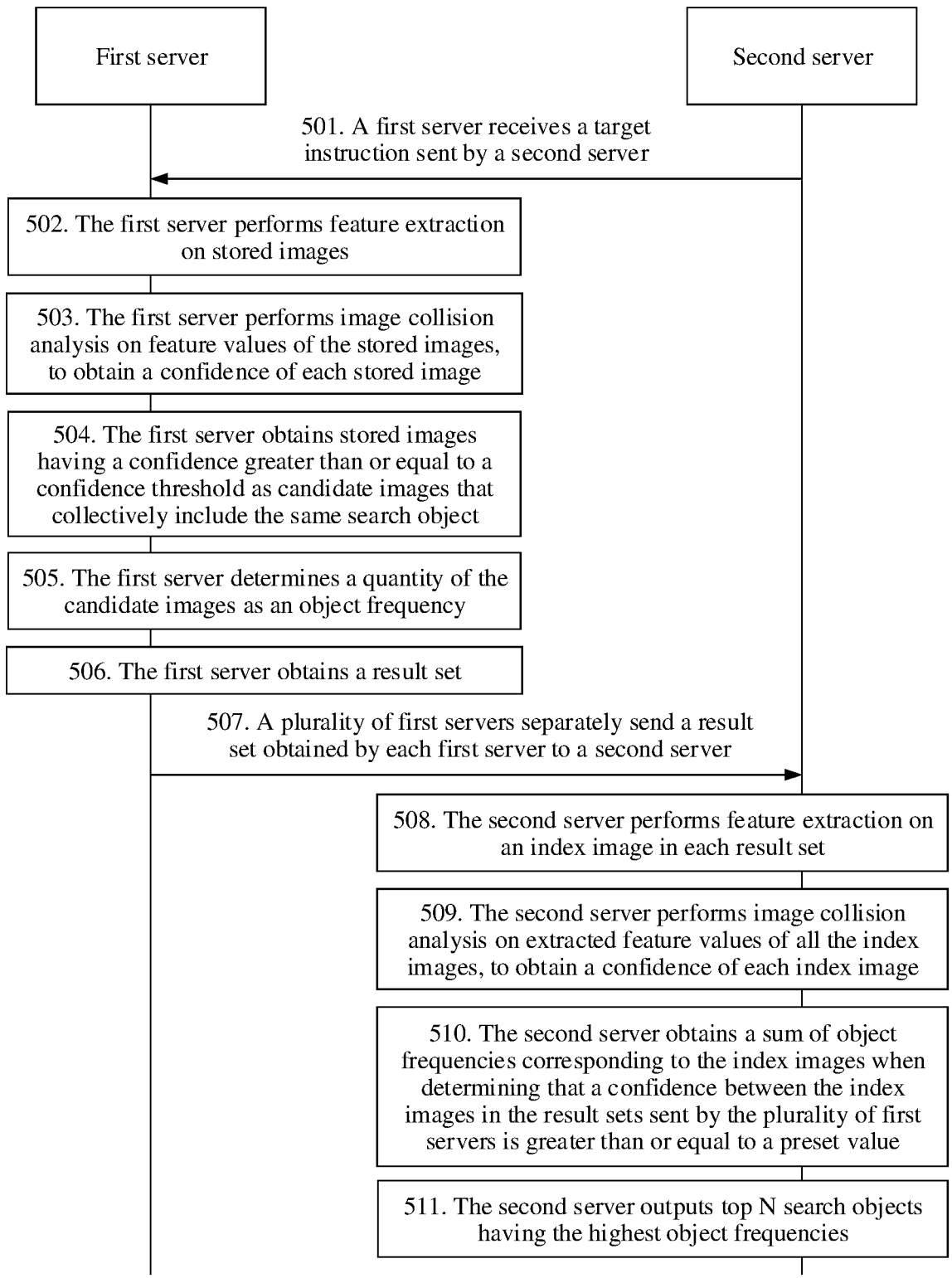
FIG. 5 is a schematic diagram of another exemplary distributed image analysis method according to an embodiment of this application.

It should be noted that the foregoing candidate images are sifted by the first server through image collision analysis from the locally stored images, and sifting conditions are obtained from instruction information sent by the second server. For ease of understanding, a specific procedure of this case is described below. Referring to FIG. 5, an exemplary distributed image analysis method according to an embodiment of this application includes the following steps.

501. A first server receives a target instruction sent by a second server.

In this embodiment, the target instruction includes a confidence threshold, and/or a target time period, and/or a target camera identifier. The confidence threshold is used by the first server to determine that stored images having a confidence greater than or equal to the confidence threshold record the same result object when the first server performs the image collision analysis.

For example, the Shenzhen server receives a target instruction from the Guangdong server. The target instruction includes a confidence threshold of 90%, a target time period of from 0:00 on Dec. 1, 2018 to 24:00 on Dec. 7, 2018, and a target camera identifier of from 1 to 100.

502. The first server performs feature extraction on stored images.

In this embodiment, the first server performs feature extraction on the stored images based on a target time period and/or a target camera identifier preset in the target instruction, to obtain feature values of the stored images.

For example, the target instruction includes the target time period and the target camera identifier. The foregoing Shenzhen server extracts stored images photographed by cameras having a target camera identifier of from 1 to 100 in a time period of from 0:00 on Dec. 1, 2018 to 24:00 on Dec. 7, 2018, and performs feature extraction.

503. The first server performs image collision analysis on feature values of the stored images, to obtain a confidence of each stored image.

In this embodiment, the first server compares the feature values of the stored images pairwise through image collision analysis, to obtain confidences between all the stored images.

504. The first server obtains stored images having a confidence greater than or equal to the confidence threshold as the candidate images that collectively include the same result object.

In this embodiment, the confidence threshold included in the target instruction sent by the second server is provided for the first server to perform sifting, and the same result object is recorded between two candidate images having a confidence greater than the confidence threshold.

For example, if the Shenzhen server obtains a confidence of 93% between two candidate images during an image collision analysis process, and the confidence is greater than the confidence threshold, the Shenzhen server determines that the two candidate images collectively record a result object.

For steps 505 to 511, refer to steps 303 to 309. Details are not repeated herein.

In this embodiment, if the target instruction includes a confidence threshold, the first server selects images having a confidence greater than the confidence threshold from the locally stored images as the candidate images when executing the image collision algorithm. That is, if a confidence between every two result objects recorded in images is higher than the confidence threshold, the result objects are determined as a same result object. If the target instruction includes a target time period, the first server obtains candidate images photographed during the target time period. If the target instruction includes a target camera identifier, the first server obtains candidate images photographed by a camera that is identified by the target camera identifier. Therefore, sifting conditions of the image collision analysis of the first server are controlled through the target instruction of the second server. In this way, in the distributed image analysis method, the first server and the second server can work cooperatively.

It should be noted that in the above method, the index image and object frequency are set in the result set, for the higher-level server to perform the second image collision analysis on the result set, to find a result object having the highest frequency of being photographed. After obtaining the result object having the highest frequency of being photographed, the user is interested in learning all images recording the result object. In this case, because each result object in the result set corresponds to only one index image, this cannot be achieved.

Figure 6A:
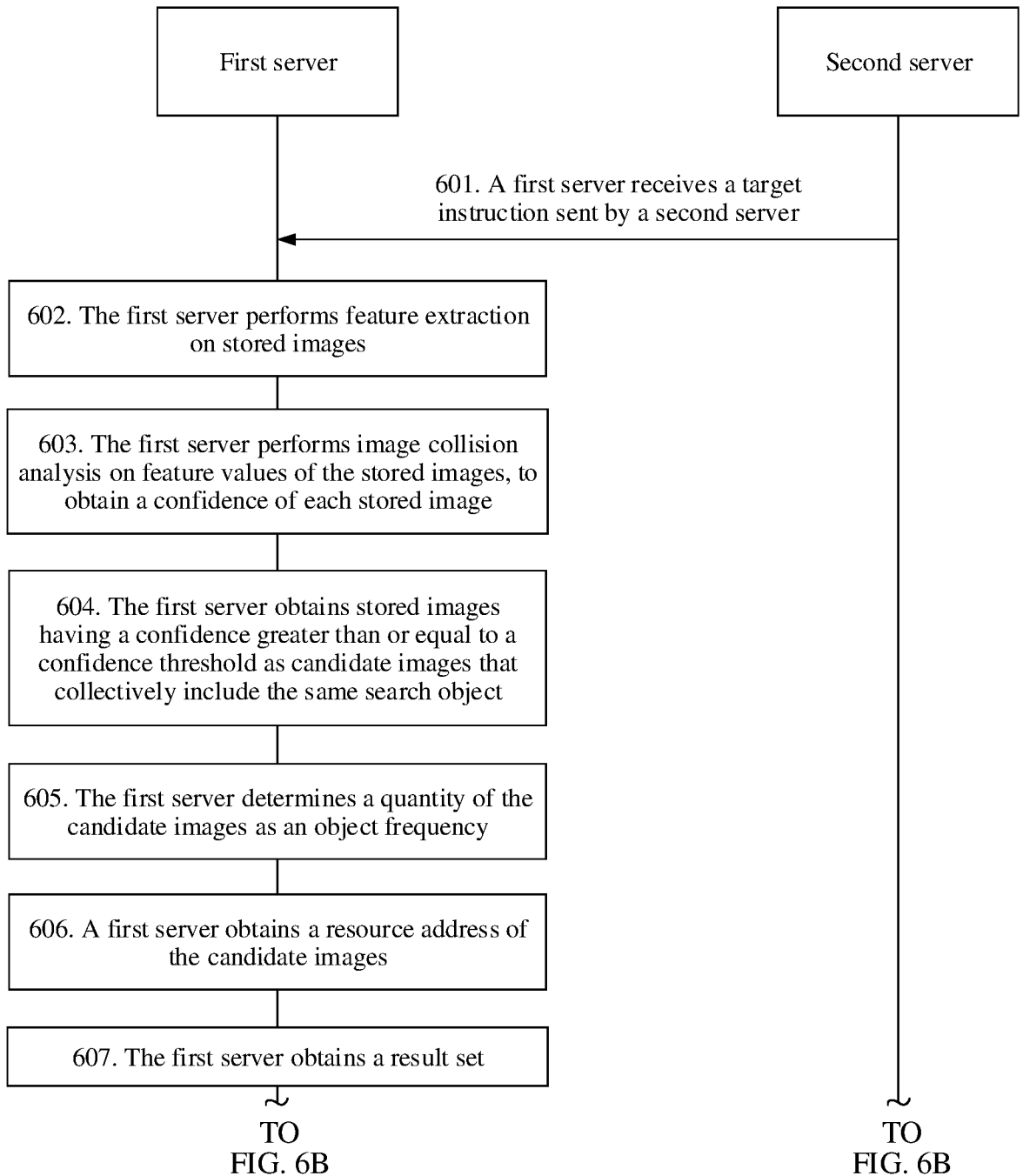

In view of the foregoing problem, this embodiment provides a solution, in which a resource address of each candidate image is added to the result set, so that the user can access resource images stored in the first server from the second server through the resource address. For ease of understanding, a specific procedure of this case is described below. Referring to FIG. 6A and FIG. 6B, an exemplary distributed image analysis method according to an embodiment of this application includes the following steps.

For steps 601 to 605, refer to steps 501 to 505. Details are not repeated herein.

606. A first server obtains a resource address of the candidate images.

In this embodiment, the resource address is a resource address of the candidate images stored in the first server, and the resource address may be a URL (Uniform Resource Locator). The resource address further records identification codes IDs of the corresponding candidate images, so that the second server can distinguish different candidate images through the IDs when accessing the candidate images through the resource address.

For steps 607 to 612, refer to steps 506 to 511. Details are not repeated herein.

613. The second server accesses the candidate images through the resource address.

In this embodiment, the second server may access, through the resource address, all candidate images that record the result object having the highest frequency of being photographed, or may access, through the resource address, all candidate images that record each result object.

In this embodiment, the resource address of the candidate images is added to the result set sent by the first server, so that the second server can access the candidate images stored in the first server through the resource address. The resource address saves more resources in terms of format and does not occupy a transmit resource and a storage resource of the second server while enabling the second server to access all candidate images, so that all candidate images recording the result object of interest are obtained.

It should be noted that the foregoing first server is a sub-level server of the second server. The second server triggers, through indication information, the first server to perform, based on conditions indicated by the indication information, a first image collision analysis task and output the result set. The second server performs the second image collision analysis based on the result set to obtain the result object having the highest frequency of being photographed in all the first servers. In an example working process, the first server may be a prefectural server, and the second server may be a provincial central server, or the first server may be a prefectural server, and the second server may be a district server. In addition, the architecture of the foregoing distributed server may be a two-level architecture including a first server and a second server, or may be a multi-level architecture, for example, including a first server, a second server, and a third server. After performing image collision analysis based on result sets sent by a plurality of first servers, the second server obtains the result object having the highest frequency of being photographed in all the first servers connected to the second server. In this case, the second server generates a new result set. The new result set includes an image having the highest confidence of the result object having the highest frequency of being photographed as an index image, and the index image correspondingly has a total frequency of being photographed of the result object. A manner in which the second server generates the new result set is the same as the manner in which the first server generates the result set. Afterward, the second server sends the new result set to the third server for third image collision analysis.

The above distributed image analysis method can effectively reduce a collision frequency of image collision analysis and reduce a quantity of server calculations while maintaining same image identification accuracy, thereby improving calculation efficiency. In a same sample, a higher similarity coefficient indicates that higher performance of the distributed image analysis method compared with that of a conventional centralized image frequency algorithm. The foregoing similarity coefficient refers to a proportion of images recording a same result object in a same result set. For example, if 50 images out of 100 images record a same result object, the similarity coefficient of the result set is 50%. The foregoing centralized image frequency algorithm refers to an algorithm in the prior art that a first server sends all stored images to a second server for unified image collision analysis. The advantages of the distributed image analysis method provided in the embodiments of the present invention are described below.

First, a calculation formula for a quantity of calculations is explained. It is assumed that a data volume D in the result set is 10,000 (that is, there are 10,000 images in the result set, and the samples are evenly distributed), a similarity coefficient is n (n images out of 10,000 images record a same result object), and a calculation frequency is m (there are m servers at a same level in the distributed image analysis method, and in the centralized image frequency algorithm, m is equal to 1)

I. In the distributed image analysis method, a quantity of calculations is equal to:

$$m\frac{\left(\frac{100000}{m}\right)^2}{2} + \frac{[10000 \times (1-n)]^2}{2}$$

The algorithms are described as follows:

1. Calculation Frequency of First Servers

A quantity of first servers is m, and a data volume processed by each first server is:

$$\frac{100000}{m}$$

When performing image collision analysis, a first server performs pairwise comparison on images, so that a calculation frequency of the pairwise comparison performed by the first server is:

$$\left(\frac{100000}{m}\right)^2$$

When the pairwise comparison is performed, two images are not compared repeatedly. For example, the first server performs pairwise comparison on an image A and an image B. After the image A has been compared with the image B once, the image B does not need to be repeatedly compared with the image A. Therefore, an actual quantity of times that the first server performs image comparison is:

$$\frac{\left(\frac{100000}{m}\right)^2}{2}$$

Because the quantity of the first servers is m, a total quantity of times that all the first servers execute the algorithm is:

$$m\frac{\left(\frac{100000}{m}\right)^2}{2}$$

2. Calculation Frequency of a Second Server

A second server obtains result sets sent by all first servers and performs second image collision analysis. Therefore, for candidate images that have been obtained through analysis in the first servers, the second server does not repeat the analysis, so that a data volume that the second server needs to process is:

$$10000 \times (1-n)$$

When performing image collision analysis, the second server performs pairwise comparison on the images, so that a calculation frequency of the pairwise comparison performed by the second server is:

$$[1000(0 < (1-n)]^2$$

Similar to the first server, when the second server performs the pairwise comparison on the images, two images are not repeatedly compared, so the actual quantity of times that the second server performs image comparisons is:

$$\frac{[10000 \times (1-n)]^2}{2}$$

Therefore, in the distributed image analysis method, for two-level server distribution, a total quantity of calculations is $$m\frac{\left(\frac{100000}{m}\right)^2}{2} + \frac{[10000 \times (1-n)]^2}{2}$$

II. For a centralized image frequency algorithm, a quantity of calculations is equal to:

$$\frac{10000^2}{2}$$

The algorithms are described as follows:

In the centralized image frequency algorithm, a second server performs pairwise collision on all received images, and a total frequency of the pairwise collision is:

$$10000^2$$

Similar to the above, when the pairwise collision is performed, two images are not repeatedly compared, so an actual quantity of times of image comparisons is:

$$\frac{10000^2}{2}$$

It is assumed that the calculation frequency m=4, that is, a quantity of first servers is 4. If a value of a similarity coefficient n differs, a calculation in the distributed image analysis method also changes accordingly. Comparison between the distributed image analysis method and the centralized image frequency algorithm in terms of that a quantity of calculations changes with a similarity coefficient n is shown in Table 1.

TABLE 1

| Similarity coefficient n of a result set | Distributed image analysis method m = 4 (calculation frequency) Quantity of calculations: $m\frac{\left(\frac{100000}{m}\right)^2}{2} + \frac{[10000 \times (1-n)]^2}{2}$ | Centralized face frequency algorithm m = 1 (calculation frequency) Quantity of calculations: $\frac{10000^2}{2}$ | Remark |
|---|---|---|---|
| n = 0 | $4\frac{(2500)^2}{2} + \frac{10000^2}{2} = 62{,}500{,}000$ | 50,000,000 | All objects are different |
| n = 20% | $4\frac{(2500)^2}{2} + \frac{8000^2}{2} = 45{,}000{,}000$ | 50,000,000 | 20% of objects are similar |
| n = 50% | $4\frac{(2500)^2}{2} + \frac{5000^2}{2} = 25{,}000{,}000$ | 50,000,000 | 50% of objects are similar |
| n = 80% | $4\frac{(2500)^2}{2} + \frac{2000^2}{2} = 14{,}500{,}000$ | 50,000,000 | 80% of objects are similar |

It can be seen from Table 1 that for the distributed image analysis method provided in embodiments of the present invention, a larger value of the similarity coefficient n indicates a less quantity of calculations is. Compared with the centralized frequency algorithm in the prior art, performance is significantly improved, a total calculation time of an image collision analysis task can be reduced, and calculation efficiency is improved.

The solutions provided in the embodiments of this application are mainly described above from a perspective of interaction between indexes at all levels and an access subject. It may be understood that, to implement the foregoing functions, the foregoing distributed image analysis system includes a corresponding hardware structure and/or software module for performing each function. A person of ordinary skill the art should easily be aware that, in combination with the examples described in the embodiments disclosed in this specification, modules and algorithms steps may be implemented by hardware or a combination of hardware and computer software. Whether a function is performed by hardware or hardware driven by computer software depends on particular applications and design constraints of the technical solutions. A person of ordinary skill in the art may use different methods to implement the described functions for each particular application, but it should not be considered that the implementation goes beyond the scope of this application.

In terms of a hardware structure, the foregoing distributed image analysis method may be implemented by a physical device, or may be jointly implemented by a plurality of physical devices, or may be implemented by a logical functional module inside a physical device. This is not specifically limited in the embodiments of this application.

Figure 7:
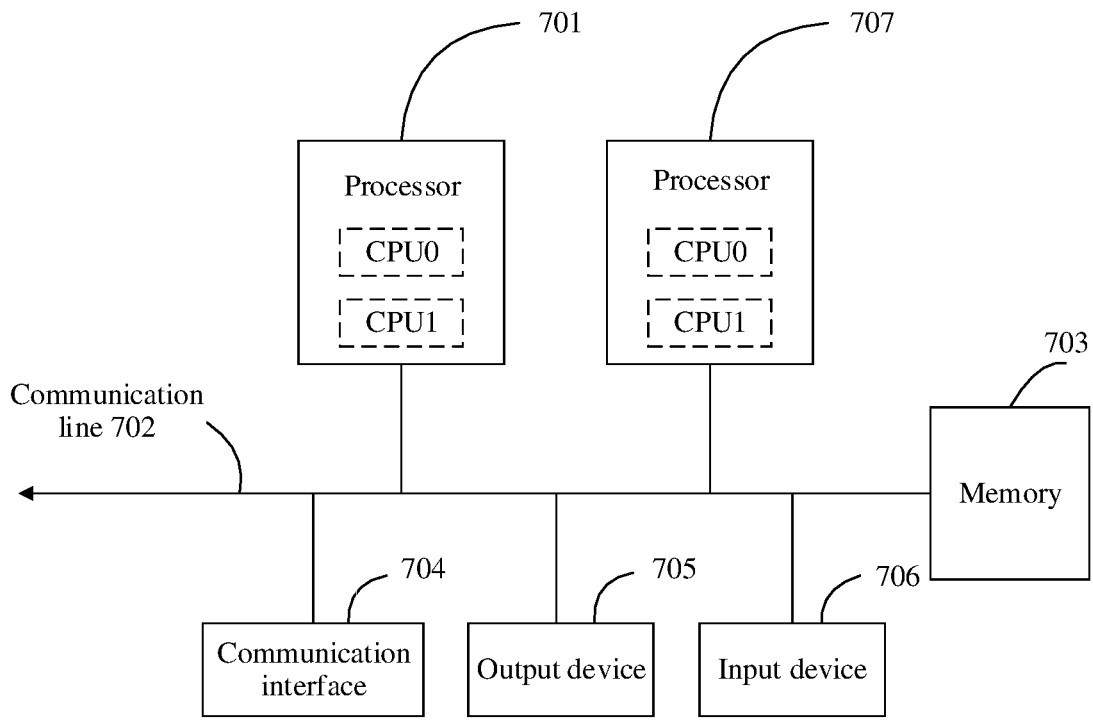
FIG. 7 is a schematic diagram of a server in an exemplary distributed image analysis system according to an embodiment of this application.

For example, the foregoing distributed image analysis method may be implemented by a communications device in FIG. 7. FIG. 7 is a schematic diagram of a hardware structure of an exemplary distributed image analysis server according to an embodiment of this application. The communications device includes at least one processor 701, a communications line 702, a memory 703, and at least one communications interface 704.

The processor 701 may be a general-purpose central processing unit (CPU), a microprocessor, an application-specific integrated circuit (ASIC), or one or more integrated circuits for controlling program execution of the solutions of this application.

The communications line 702 may include a path for transmitting information between the foregoing components.

The communications interface 704 that uses any apparatus such as a transceiver is configured to communicate with another device or a communications network, for example, the Ethernet, a radio access network (RAN), or a wireless local area network (WLAN).

The memory 703 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium that is capable of carrying or storing expected program code in a form of instructions or data structures and capable of being accessed by a computer, but is not limited thereto. The memory may exist independently and is connected to the processor through the communications line 702. The memory may be alternatively integrated with the processor.

The memory 703 is configured to store one or more computer-executable instructions for executing the solutions of this application, and the processor 701 controls the execution. The processor 701 is configured to execute the one or more computer-executable instructions stored in the memory 703, to implement the charging management method provided in the following embodiments of this application.

Optionally, the one or more computer-executable instructions in the embodiments of this application may also be referred to as application program code. This is not specifically limited in the embodiments of this application.

During an example implementation, in an embodiment, the processor 701 may include one or more CPUs, for example, a CPU 0 and a CPU 1 in FIG. 7.

During an example implementation, in an embodiment, the communications device may include a plurality of processors, for example, the processor 701 and a processor 707 in FIG. 7. Each of the processors may be a single-core (single-CPU) processor, or may be a multi-core (multi-CPU) processor. The processor herein may be one or more devices, circuits, and/or processing cores configured to process data (for example, one or more computer program instructions).

During an example implementation, in an embodiment, the communications device may further include an output device 705 and an input device 706. The output device 705 communicates with the processor 701, and may display information in a plurality of manners. For example, the output device 705 may be a liquid crystal display (LCD), a light emitting diode (LED) display device, a cathode ray tube (CRT) display device, a projector, or the like. The input device 706 communicates with the processor 701, and may receive an input from a user in a plurality of manners. For example, the input device 706 may be a mouse, a keyboard, a touchscreen device, a sensor device, or the like.

The foregoing communications device may be a general-purpose device or a dedicated device. During implementation, the communications device may be a server, a wireless terminal device, an embedded device, or a device having a structure similar to that in FIG. 7. A type of the communications device is not limited in the embodiments of this application.

In the embodiments of this application, the distributed image analysis server may be divided into functional units based on the foregoing method examples. For example, functional modules may be obtained through division based on corresponding functions, or two or more functions may be integrated into one processing unit. The integrated unit may be implemented in a form of hardware, or may be implemented in a form of a software functional unit. It should be noted that division into the units in the embodiments of this application is an example, is merely logical function division and may be other division during actual implementation.

Figure 8:
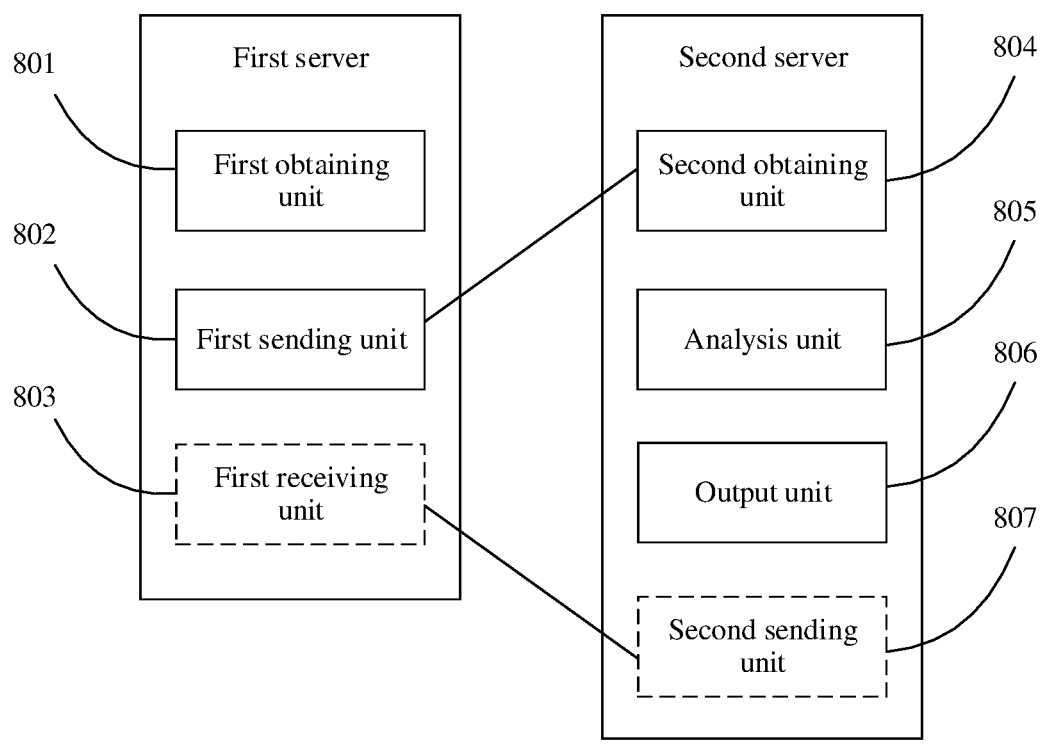
FIG. 8 is a schematic diagram of an exemplary apparatus of a distributed image analysis system according to an embodiment of this application.

For example, when the functional units are obtained through division in an integrated manner, FIG. 8 is a schematic structural diagram of an exemplary distributed image analysis system according to an embodiment of the present disclosure.

As shown in FIG. 8, the distributed image analysis system provided in an embodiment of this application includes a first server and a second server.

The first server includes:

a first obtaining unit 801, configured to obtain a result set through image collision analysis, where the result set includes an index image, the index image records a result object, the index image corresponds to an object frequency, and the object frequency is used to indicate a quantity of times that the result object is photographed; and a first sending unit 802, configured to send the result set obtained by the first obtaining unit 801 to the second server, where the result set is used for the second server to perform second image collision analysis.

Optionally, the first obtaining unit 801 is further configured to:

obtain a plurality of candidate images, where the candidate images are images that include the result object among images stored in the first server, and determine the index image from the plurality of candidate images; and determine a quantity of the candidate images as the object frequency.

Optionally, the first server further includes a first receiving unit 803, where the first receiving unit 803 is configured to:

receive a target instruction sent by the second server, where the target instruction includes a confidence threshold.

Correspondingly, the first obtaining unit 801 is configured to:

perform feature extraction on stored images, to obtain a feature value of each of the stored images, where the stored images are all images stored in the first server;

perform image collision analysis on feature values of the stored images, to obtain a confidence of each stored image; and obtain stored images having a confidence greater than or equal to the confidence threshold as candidate images that collectively include a same result object.

Optionally, the first receiving unit 803 is further configured to:

receive the target instruction sent by the second server, where the target instruction further includes a target time period and/or a target camera identifier.

Correspondingly, the first obtaining unit 801 is further configured to perform feature extraction on the stored images in the target time period, and/or perform feature extraction on the stored images photographed by a camera that is identified by the target camera identifier.

Optionally, the first obtaining unit 801 is further configured to:

obtain image quality of each candidate image through an image analysis algorithm; and select an image having the highest image quality from the candidate images as the index image.

Optionally, the first obtaining unit 801 is further configured to:

obtain a resource address of the candidate images; and obtain the result set, where the result set includes the resource address, where the resource address is used for the second server to access the candidate images through the resource address.

The second server includes:

a second obtaining unit 804, configured to receive a result set that is separately sent by a plurality of first servers and that is obtained by each first server, where each result set includes an index image, the index image records a result object, the index image corresponds to an object frequency, and the object frequency is used to indicate a quantity of times that the result object is photographed;

an analysis unit 805, configured to: perform feature extraction on an index image in each result set, to obtain a feature value of the index image, and perform image collision analysis on extracted feature values of all index images, to obtain a confidence of each index image; and an output unit 806, configured to: when determining that a confidence between the index images in the result sets sent by the plurality of first servers is greater than or equal to a preset value, obtain a sum of object frequencies corresponding to the index images.

Optionally, the result set includes a resource address of the candidate images, where the candidate images are images that record the result object among images stored in the first server, and the stored images are all images stored in the first server. The second obtaining unit 804 is further configured to access the candidate images through the resource address.

Optionally, the second server further includes a second sending unit 807, configured to send a target instruction to the first server, where the target instruction includes a confidence threshold, and a confidence of any candidate image in the first server is greater than or equal to the confidence threshold.

Optionally, the second sending unit 807 is further configured to send a target instruction to the first server, where the target instruction further includes a target time period and/or a target camera identifier. The target instruction is used for the first server to perform feature extraction on the stored images in the target time period, and/or perform feature extraction on the stored images photographed by a camera that is identified by the target camera identifier.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the steps of the methods in the embodiments may be implemented by a program indicating related hardware. The program may be stored in a computer-readable storage medium. The storage medium may include: a ROM, a RAM, a magnetic disk, or a compact disc.

The foregoing describes in detail the distributed image analysis method and system, and the storage medium provided in the embodiments of the present invention. Specific examples are used for illustrating principles and implementations of the present invention. The foregoing description about the embodiments is merely intended to help understand the methods and core ideas of the present invention. In addition, a person of ordinary skill in the art may make modifications to the specific implementations and application scopes based on the ideas of the present invention. In conclusion, the content of this specification should not be construed as a limitation on the present invention.

What is claimed is:

1. A distributed image analysis method performed by an image analysis system comprising a plurality of first servers and a second server, wherein the method comprises:

obtaining, by each of the plurality of first servers, a plurality of candidate images of a result object, wherein the obtaining of the plurality of candidate images of the result object comprises:

performing feature extraction on images stored on the first server to obtain a feature value of each of the stored images, comparing the feature values of the stored images to determine, for each of the stored images, a similarity value indicating similarity between the stored image and each other stored image in the stored images, and determining images, in the stored images, having similarity values greater than or equal to a similarity threshold as the plurality of candidate images of the result object;

separately sending, by each of the plurality of first servers, a result set obtained by the first server to the second server, wherein the result set comprises an index image of the result object, and the index image is an image determined based on the plurality of candidate images of the result object and is associated with an object frequency indicating a quantity of times that the result object is photographed;

performing, by the second server, feature extraction on each of the index images in the result sets received from the plurality of first servers, to extract a feature value of the index image;

comparing, by the second server, the extracted feature values of the index images in the result sets received from the plurality of first servers, to determine, for each of the index images, a similarity value indicating similarity between the index image and each other index image in the index images in the result sets; and when determining that the similarity values between at least some of the index images in the result sets received from the plurality of first servers are greater than or equal to a preset value, calculating, by the second server, a sum of object frequencies of those index images between which the similarity values are greater than or equal to the preset value, the sum indicating a total number of times that the result object is photographed, wherein each of the plurality of first servers is a physical device including a memory and a processing circuitry, and the second server is a physical device including a memory and a processing circuitry, wherein the method further comprises, after the obtaining, by each of the plurality of first servers, a plurality of candidate images of a result object;

obtaining, by the first server, a resource address of the plurality of candidate images, and obtaining, by the first server, the result set, wherein the result set comprises the resource address; and after the calculating of the sum of object frequencies corresponding to the index images, accessing, by the second server, the plurality of candidate images through the resource address.

2. The method according to claim 1, wherein the obtaining, by each of the plurality of first servers, a plurality of candidate images of a result object further comprises:

determining, by the first server, the index image from the plurality of candidate images; and determining, by the first server, a quantity of the plurality of candidate images as the object frequency associated with the index image.

3. The method according to claim 2, further comprising, before the obtaining, by each of the plurality of first servers, a plurality of candidate images of a result object:

receiving, by the first server, a target instruction sent by the second server, wherein the target instruction comprises the similarity threshold.

4. The method according to claim 3, wherein the target instruction further comprises a target time period and/or a target camera identifier, and the performing of feature extraction on each of the stored images comprises:

performing feature extraction on the stored images in the target time period, and/or performing feature extraction on the stored images photographed by a camera that is identified by the target camera identifier.

5. The method according to claim 2, wherein the determining, by the first server, the index image from the plurality of candidate images comprises:

obtaining, by the first server, image quality of each of the plurality of candidate images through an image analysis algorithm; and selecting, by the first server, an image having the highest image quality from the plurality of candidate images as the index image.

6. A distributed image analysis system, comprising a plurality of first servers and a second server connected to the plurality of first servers, wherein each of the plurality of first servers comprises at least one first processor and a first memory storing first instructions that, when executed by the at least one first processor, cause the first server to obtain a plurality of candidate images of a result object, wherein the obtaining of the plurality of candidate images of the result object comprises:

performing feature extraction on images stored on the first server to obtain a feature value of each of the stored images, comparing the feature values of the stored images to determine, for each of the stored images, a similarity value indicating similarity between the stored image and each other stored image in the stored images, and determining images, in the stored images, having similarity values greater than or equal to a similarity threshold as the plurality of candidate images of the result object; and the second server comprises at least one second processor and a second memory storing second instructions that, when executed by the at least one second processor, cause the second server to:

receive a result set from each of the plurality of first servers, wherein the result set is obtained by the first server, the result set comprises an index image of the result object, and the index image is an image determined based on the plurality of candidate images of the result object and is associated with an object frequency indicating a quantity of times that the result object is photographed;

perform feature extraction on each of the index images in the result sets obtained by the plurality of first servers, to extract a feature value of the index image;

compare the extracted feature values of the index images in the result sets received from the plurality of first servers, to determine, for each of the index images, a similarity value indicating similarity between the index image and each other index image in the index images in the result sets;

and when determining that the similarity values between at least some of the index images in the result sets received from the plurality of first servers are greater than or equal to a preset value, calculate a sum of object frequencies corresponding to those index images between which the similarity values are greater than or equal to the preset value, the sum indicating a total number of times that the result object is photographed, wherein each of the plurality of first servers is a physical device, and the second server is a physical device, wherein the first instructions, when executed by the at least one first processor, further cause the first server to:

after the obtaining a plurality of candidate images of a result object;

obtain a resource address of the plurality of candidate images, and obtain the result set, wherein the result set comprises the resource address; and wherein the second instructions, when executed by the at least one second processor, further cause the second server to:

after the calculating of the sum of object frequencies corresponding to the index images, access the plurality of candidate images through the resource address.

7. The system according to claim 6, wherein the first instructions, when executed by the at least one first processor, further cause the first server to:

determine the index image from the plurality of candidate images; and determine a quantity of the plurality of candidate images as the object frequency associated with the index image.

8. The system according to claim 7, wherein the first instructions, when executed by the at least one first processor, further cause the first server to:

receive a target instruction sent by the second server, the target instruction comprising the similarity threshold.

9. The system according to claim 8, wherein the target instruction further comprises a target time period and/or a target camera identifier, and the performing of feature extraction on the images stored on the first server comprises:

performing feature extraction on the stored images in the target time period, and/or perform feature extraction on the stored images photographed by a camera that is identified by the target camera identifier.

10. The system according to claim 7, wherein the first instructions, when executed by the at least one first processor, further cause the first server to:

obtain image quality of each of the plurality of candidate images through an image analysis algorithm; and select an image having the highest image quality from the plurality of candidate images as the index image.

* * * * *